UNITED STATES PATENT OFFICE.

JOSEPH BROWN, OF MOUNT CLEMENS, MICHIGAN.

INSECTICIDE.

SPECIFICATION forming part of Letters Patent No. 496,110, dated April 25, 1893.

Application filed January 3, 1893. Serial No. 457,124. (No specimens.)

*To all whom it may concern:*

Be it known that I, JOSEPH BROWN, a citizen of the United States, residing at Mount Clemens, county of Macomb, State of Michigan, have invented a certain new and useful Improvement in Insect-Destroying Compounds; and I declare the following to be a full, clear, and exact description of the same, such as will enable others skilled in the art to which it pertains to make and use the same.

My invention relates to insect destroying compounds or insecticides so called, and consists in the ingredients hereinafter described compounded as set forth.

As the active ingredients I use the following elements compounded in substantially the following manner and proportions: of cudbear, two drams; cloves, two drams; carmine, dry, two drams; borax, one-half pound, pulverizing each ingredient finely and thoroughly mixing.

As a diluent I use of any inert powder, preferably powdered chalk, in about the proportion of equal weights of chalk to the mixture, as one pound of chalk to one pound of the mixture.

The powder thus manufactured is scattered by sprinkling or in any convenient manner in and around the haunts of insects which infest houses, and will be found efficient in destroying them. It is especially effective with regard to cockroaches and ants, and has the merit of being non-poisonous to human beings, hence its use is wholly unattended with danger.

Having thus described my invention, what I desire to claim is—

1. The improved insect destroying compound herein described, consisting of pulverized cudbear, carmine, cloves and borax, in substantially the proportions given.

2. An insect destroying compound consisting of a mixture of pulverized cudbear, carmine, cloves, borax and an inert diluent powder in substantially the proportions specified.

In testimony whereof I sign this specification in the presence of two witnesses.

JOSEPH BROWN.

Witnesses:
R. A. PARKER,
EFFIE I. CROFT.